July 11, 1933.   J. BETHENOD   1,917,488
ELECTRIC SERVO MOTOR FOR AUTOMOBILES OR THE LIKE
Filed May 7, 1929
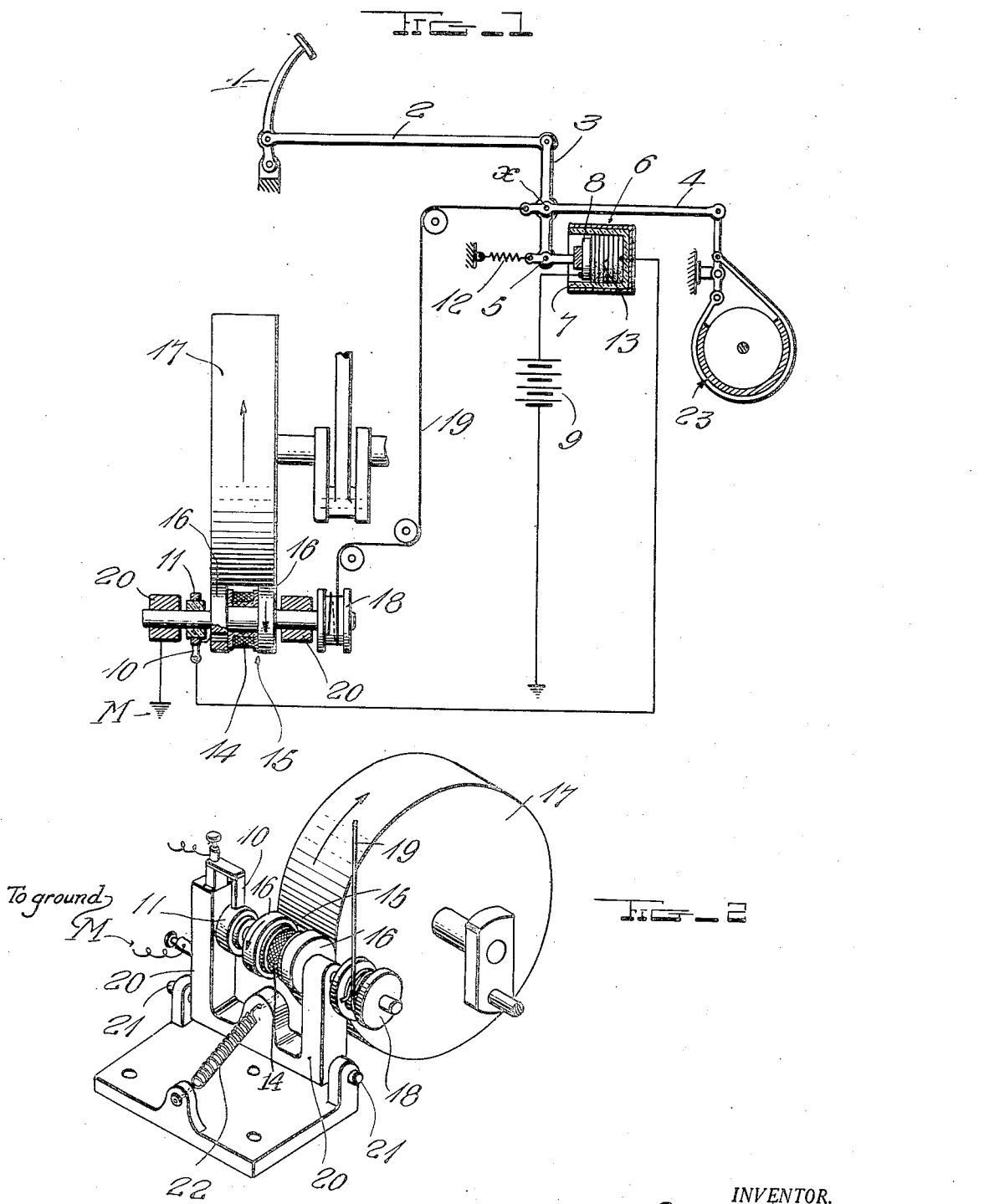

Patented July 11, 1933

1,917,488

UNITED STATES PATENT OFFICE

JOSEPH BETHENOD, OF PARIS, FRANCE

ELECTRIC SERVO-MOTOR FOR AUTOMOBILES OR THE LIKE

Application filed May 7, 1929, Serial No. 361,214, and in France May 12, 1928.

My invention has for its object to provide an electric servo motor for automobiles for applying under control of the operator, a torque or force to any desired mechanical part of the automobile. My invention contemplates, in its principle, an electromagnetic clutch designed to connect at will, the part to be controlled with any revolving part of the automobile such as the transmission shaft, crank shaft or engine fly-wheel. Moreover, this clutch is preferably arranged in such a manner as to make the force that it develops proportional to the power directly applied to the pedal or control element by means of foot or hand.

This clutch may be used to transmit a powerful braking force to the wheels of the vehicle. Provision may be made for an automatic uncoupling of the clutch as soon as the usual control member is released by the foot, in accordance with a design heretofore proposed by me.

In a preferred embodiment of my invention, I use a friction wheel, the frictional application of which is caused by an electromagnetic device. This wheel may be for instance constructed of a magnetizable cylinder having a central groove wherein a magnetizing annular winding is mounted. Whenever the current flows through this winding, the ends of the cylinder are attracted and caused to rub against a ferromagnetic hub fastened on a transmission shaft, or against the engine fly-wheel.

The displacement of the cylinder is transmitted to the braking mechanism, clutch or similar member, by means of any convenient device, that is to say a rope, chain, lever, rod or limb. To obtain the servo effect, it is preferable to use the reaction against a point of support on the chassis, corresponding to the mechanical force applied by foot or hand, directly impressed on the part to be controlled. This point of support is capable of some elastic displacement, this displacement being used for instance to operate a rheostat inserted in the coil supply circuit. This rheostat may be conveniently constructed of carbon washers stacked in a pile and more or less pressed together by the elastic reaction of the aforesaid point of support, the ohmic resistance diminishing as the pressure increases, following the application of hand or foot.

In order to make my invention clear, reference is made to the accompanying drawing which shows diagrammatically as an example one embodiment of my invention relating to the braking of a motor car and in which:

Figure 1 shows a front view of the assembly partly in section; and Fig. 2 shows a side view in perspective.

The foot pedal 1 when depressed, acts on the brake shoes 23 of the car by means of the rods 2 and 4, connected together by the lever 3 pivoted at 5. The bearing 5 is supported by a piston 8 which is displaced in the cylinder 6 when the force applied to the bearing 5 exceeds the restraining force of the spring 12. The internal wall of the metallic cylinder 6 is coated with insulating material, and between its bottom 7 and the piston 6 is compressed a stack of washers 13 made of suitable conductive material, such as carbon or the like, suitable for a rheostat. The bottom 7 is connected by means of a brush 10 and an insulated ring 11 to the exciting coil 14 of the electromagnetic pulley 15, the cheeks 16 of which are in contact with the surface of the fly-wheel 17 of the motor of the car, when the coil 14 is energized. The electric circuit of the battery 9 is closed through the ground or frame indicated at M, and it will be readily understood that the pressure between the cheeks 16 and the fly-wheel 17 increases with the exciting current, when the ohmic resistance of the pile rheostat 13 drops under the effect of the force applied at 5. In this manner, the pull on the rope 19 which is wound on the drum 18, increases with the foot pressure on the pedal 1, and it is thus easy to provide a mechanical arrangement by means of which the force of this pull is added to the force applied directly to the rod 4. In order to allow the disengagement of the pulley 15, when deenergized, the shaft on which the pulley 15 and the drum 18 are mounted can be supported by an oscillating frame 20, pivoted at 21, a relief spring 22 being provided.

As soon as the operator presses his foot upon the foot pedal 1, no action manifests itself until the moment when the brake commences to oppose a resistance to the movement of bar 4. Beginning from this moment, or with the simultaneous action of the efforts exerted by 2 and 4 (by consequence of the foot of the operator commencing to feel a sense of resistance) and of an effort of pressure upon the piston 8, the variations of resistance 13 vary with the excitation of the winding 14 in such a manner that the force of attraction between the fly wheel 17 and the cheeks 16 varies. The force exerted through rope 19 on the pulley 18 operates upon the bar 4 concurrent with the operator and proportional with the pressure of the foot by the latter.

It will be apparent that with this combination, braking by simple foot pressure is still available by means of the direct action of the rod 4 even if the electric circuit should fail. Furthermore it is possible to provide a self-braking effect if the angle between the direction of the rope 19 and the line of the centers of wheels 16 and 17 is chosen sufficiently small, the action of the pull on the rope 19 is thus added to the action of the magnetic contact in order to increase the pressure between the friction surfaces.

While I have described my invention in a certain preferred embodiment, I desire that it be understood that modifications may be made and that no limitations are intended other than are imposed by the scope of the appended claims.

What I claim as new and desire to secure by Letters Patent of the United States is as follows:

1. An electric servo motor for motor cars or the like, comprising in combination a control adapted to be actuated by an operator, a mobile element to be controlled, a source of electric current, a rotatable electromagnetic pulley, means for applying a magnetizing force to said pulley, a rotating element of said car mounted for controlled contact with said pulley when said magnetizing force is applied thereto, means to transmit the torque of said pulley to the mobile element to be controlled, mechanical means for applying mechanical force from said control directly to said mobile element, and means for rendering said torque proportional to the force directly exercised by the operator on said mobile element, said torque being zero when said force is zero.

2. An electric servo motor for motor cars or the like, comprising in combination a control adapted to be actuated by an operator, a mobile element to be controlled, a source of electric current, an electromagnetic pulley, an actuating winding therefor, a fly-wheel driven by the car propulsive motor, said pulley being mounted to rub against said fly-wheel when said pulley is magnetized, means to transmit the torque of the said pulley to said mobile element, mechanical means for applying mechanical force from said control directly to said mobile element, and means for rendering said torque proportional to the force directly exercised by the operator on said mobile element, said torque being zero when said force is zero.

3. An electric servo motor for motor cars or the like, comprising in combination a source of electric current, a control adapted to be actuated by an operator, a mobile element to be controlled associated with the said control, an electromagnetic pulley, a magnetizing winding therefor, a rotating element of said car, said pulley being driven by said rotating element when said pulley is magnetized, a rheostat comprising a pile of conductive washers inserted in the electric circuit of said magnetizing winding, means for adjusting the pressure between said washers in cooperation with the pressure directly impressed by the operator on said mobile element, mobile element means to transmit the torque of said pulley to the said mobile element, and means for rendering said torque proportional to the force directly exercised by the operator on said mobile element, said torque being zero when said force is zero.

4. Apparatus for controlling mobile parts of automobiles, comprising a part to be controlled, a control member actuated by the operator and exercising a direct mechanical force on the part controlled, an electromagnetic device actuated simultaneously with the said control member and acting on the controlled part and applying thereto a mechanical force of the same sense as the said control member applies when actuated by the operator, apparatus for controlling the applied force controlled by said control member actuated by the operator and varying the current applied to said electromagnetic device, and means for causing the instant of commencement of the variation of the current to coincide with the instant of initial application of the force acting on the part to be controlled.

5. Apparatus for controlling mobile parts of automobiles, comprising a part to be controlled, a control member actuated by the operator and exercising a mechanical force on the part controlled, an electromagnetic device whose core is actuated simultaneously with the said control member and is mechanically related to the said part controlled so as to exercise thereon a force of the same sense as said control member exercises when said control member is actuated by the operator, a variable resistance inserted in the excitation circuit of said electromagnetic device, means for varying said resistance controlled by said control member, and means for causing the instant of the commencement of the variation of the resistance to coincide with the instant of intial application of the force acting on the part to be controlled.

6. Apparatus for controlling parts of automobiles, comprising a part to be controlled, a control member actuated by the operator and exercising a mechanical action on said controlled part, a friction wheel with circumferential surface of magnetic material and having a magnetizing winding, a magnetic rotating element adapted to engage said friction wheel, a cable system actuated by said wheel and connected to said part to be controlled for exercising thereon a force of the same sense as the said control member exercises when actuated by the operator, a circuit for said magnetizing winding of said wheel comprising inductors and a variable resistance controlled by said control member and means for causing the instant of the commencement of the variation of the resistance to coincide with the instant of initial application of the force acting on the part to be controlled.

7. In a control system for automobiles, a control member adapted to be actuated by an operator, a mobile controlled element to which force is to be applied, a mechanical system by which said control member applies force directly to said controlled element, a wheel driven by the motive power of the automobile, an electromagnetic pulley mounted for circumferential engagement with the circumferential periphery of said wheel, a magnetizing winding for said pulley, means actuated by said pulley for applying force to said controlled element, a variable resistor for controlling the current of said magnetizing winding, said resistor being controlled by said control member actuated by the operator, whereby the force applied directly mechanically by the operator acts cooperatively in the same sense with the force applied electromagnetically to apply force to said controlled element, said two forces being proportional to each other and simultaneously neutralizing each other.

8. An arrangement for controlling parts of automobiles, comprising a part to be controlled, a link member associated with said part, an electromagnetic device applying a force to said link member, means for actuating said device comprising a source of current and an apparatus comprising a mobile member to continuously vary the current supplied by said source, a lever device actuated directly by the operator for simultaneously applying a direct force to said link member and controlling the displacements of said mobile member, spring tension means opposing the operation of said lever device, and means for causing the instant of initiating said direct force to said mobile member to coincide automatically with the instant that the spring tension means on said lever device is overcome to impart a force acting on the said mobile member to cause its displacement.

9. An arrangement for controlling parts of automobiles comprising a part to be controlled, a link member associated with said part, an electromagnetic arrangement applying a force to said link member, means for actuating said device comprising a source of current and an apparatus comprising a mobile member for continuously varying the current supplied by said source, means actuated directly by the operator to simultaneously apply a direct force to said link member and to control the displacements of said mobile member, and a mechanical system transmitting the force applied by the operator in part to said link member and in part to said mobile member, said system being provided with means for providing that the application of force to said mobile member after the imparting of an initial force thereto shall occur only simultaneously with and proportional to the application of force to said link member.

10. An arrangement for controlling parts of automobiles comprising a part to be controlled, a link member associated with said part, an electromagnetic device applying a force to said link member, means for actuating said device comprising a source of current and an apparatus comprising a mobile member for continuously varying the current supplied by said source, and means directly actuated by the operator for simultaneously applying direct force to said link member and controlling the displacements of said mobile member, said means comprising a lever attached to said mobile member and rotatable around a point in said link member.

JOSEPH BETHENOD